United States Patent [19]
Griffin, Jr. et al.

[11] Patent Number: 5,083,901
[45] Date of Patent: Jan. 28, 1992

[54] ELECTRICITY GENERATING WIND TURBINE

[76] Inventors: Ralph C. Griffin, Jr., 12151 Cherry St., Los Alamitos, Calif. 90720; John F. Ramo, 4194 Chesire Dr., Cypress, Calif. 90630

[21] Appl. No.: 696,336

[22] Filed: May 1, 1991

Related U.S. Application Data

[63] Continuation of Ser. No. 418,923, Oct. 6, 1989, abandoned, which is a continuation of Ser. No. 349,989, May 8, 1989, abandoned, which is a continuation of Ser. No. 277,329, Nov. 29, 1988, abandoned.

[51] Int. Cl.⁵ .............................................. F03D 3/06
[52] U.S. Cl. ...................................... 416/87; 416/119; 416/197 A
[58] Field of Search ...................... 416/87, 88, 89, 101, 416/119, 131 R, 197 A, DIG. 8

[56] References Cited

U.S. PATENT DOCUMENTS

| | | | |
|---|---|---|---|
| 2,812,823 | 11/1957 | De Oviedo | 416/87 |
| 4,004,861 | 1/1977 | Soules | 416/119 |
| 4,209,281 | 6/1980 | Edmunds | 416/197 A |
| 4,365,934 | 12/1982 | Mason | 416/197 A |
| 4,402,650 | 9/1983 | Jones | 416/197 A |
| 4,490,623 | 12/1984 | Goedecke | 416/119 |
| 4,537,559 | 8/1985 | Herrmann | 416/119 |
| 4,970,404 | 11/1990 | Barger | 416/119 |

FOREIGN PATENT DOCUMENTS

| | | | |
|---|---|---|---|
| 2821899 | 11/1979 | Fed. Rep. of Germany | 416/DIG. 8 |
| 3607278 | 9/1987 | Fed. Rep. of Germany | 416/197 A |
| 35860 | 3/1930 | France | 416/197 A |
| 32076 | 2/1982 | Japan | 416/87 |
| 252461 | 5/1926 | United Kingdom | 416/87 |

Primary Examiner—Edward K. Look
Assistant Examiner—James A. Larson
Attorney, Agent, or Firm—Allan M. Shapiro

[57] ABSTRACT

A drum is mounted for rotation about an axis. Its surface is substantially cylindrical about the axis, and axially mounted outside of the surface is a plurality of vanes each defining a slot with respect to the surface. The slot is an aerodynamic slot where accelerating air decreases pressure to produce thrust which is in the direction of rotation. The outer surface of the drum is not quite cylindrical, but is shaped to be of larger diameter at the slot to enhance Venturi action.

20 Claims, 2 Drawing Sheets

ELECTRICITY GENERATING WIND TURBINE

This is a continuation application of Ser. No. 07/418,923 filed Oct. 6, 1989, now abandoned, which is a continuation application of Ser. No. 07/349,989 filed May 8, 1989, now abandoned, which is a continuation application of Ser. No. 07/277,329 filed Nov. 29, 1988, now abandoned.

FIELD OF THE INVENTION

This invention is directed to an electricity generating wind turbine and particularly a turbine with a plurality of vanes which interact with a drum surface to define an aerodynamic Venturi slot to enhance thrust resulting from the air passing therethrough.

BACKGROUND OF THE INVENTION

The conversion of the kinetic energy of moving air, the atmospheric wind, to other forms of energy is well known. Windmills have long been used for the pumping of water and in recent years have been used for driving generators for the generation of electricity. The ordinary windmill, where the blade extends radially outward from the axis of rotation, suffers from the problem that the velocity of the blade increases with increasing radius and the angle of attack changes unless the blade is skewed or twisted. The twisted blades have different effects at different rotational speeds. In extracting kinetic energy from the wind, the wind velocity is not known. Consequently, the blade is properly skewed for only one condition. It is desirable to avoid skewed blades.

Seki U.S. Pat. No. 4,247,253 defines a structure wherein the blades are parallel to the axis of revolution. Amick U.S. Pat. No. 4,162,410 defines another structure with axially positioned blades. The Amick structure is also enhanced by the utilization of fixed stator blades to control the direction of wind flow onto the rotating blades. There is no adjustment in the structure for accommodation of different wind velocities. Furthermore, the stator blades present a large wind resistance which requires a strong overall structure.

Accordingly, there is a need for an electricity generating wind turbine which accomplishes the advantages of axially positioned blades and which employs cooperating structure for enhancing the performance of the axial blades, all without presenting excessive structures subject to wind pressure.

SUMMARY OF THE INVENTION

In order to aid in the understanding of this invention, it can be stated in essentially summary form that it is directed to an electricity generating wind turbine which includes a drum rotating on an axis and a plurality of blades mounted on the drum parallel to the axial rotation. The blades are adjustably mounted with respect to the drum surface, and the drum surface is configured with a uniform cross section, to enhance the slot defined between the drum surface and the blade.

It is thus an object and advantage of this invention to produce an electricity generating wind turbine which is self-adjustable to different wind conditions so as to efficiently convert the kinetic energy of the moving wind and various wind velocities.

It is another object and advantage of this invention to provide an electricity generating wind turbine which employs blades of uniform cross section to avoid skewed or twisted blades, as is found in radially positioned turbine blades.

It is another object and advantage of this invention to provide an electricity generating wind turbine which can be supplied as a unitary structure, with the unit to be of modest size and already affixed to its base and generator so that it may be distributed as a unit and conveniently and economically installed.

It is another object and advantage of this invention to provide an electricity generating wind turbine which is economic of construction and sufficiently light of weight so that it may be mounted upon ordinary raised structures without the need for special structural work.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENTS

Figure 1:
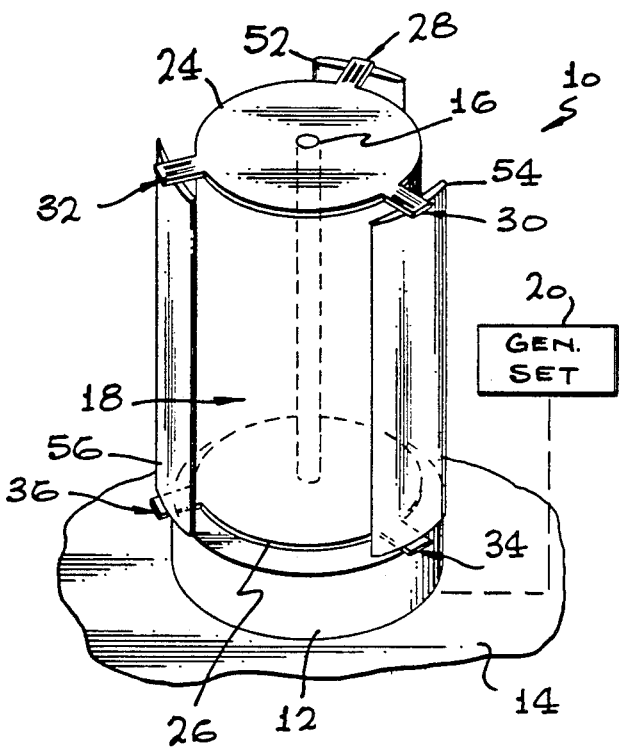
FIG. 1 is an isometric view of the electricity generating wind turbine of this invention.

The electricity generating wind turbine of this invention is generally indicated at 10 in FIG. 1. Base 12 is mounted on a convenient support 14, which may be the ground, the roof of the building, or a special tower structure specifically designed to support one or more of the turbines 10. Shaft 16 defines the axis and is rotatably mounted on base 12. Drum 18 is mounted on shaft 16 and connected so that, when the drum rotates, the shaft rotates. Electricity generating set 20 is schematically shown in FIG. 1. It is a device which converts the mechanical power of rotating shaft 16 to electrical power. The generating set 20 may be positioned within base 12.

Figure 2:
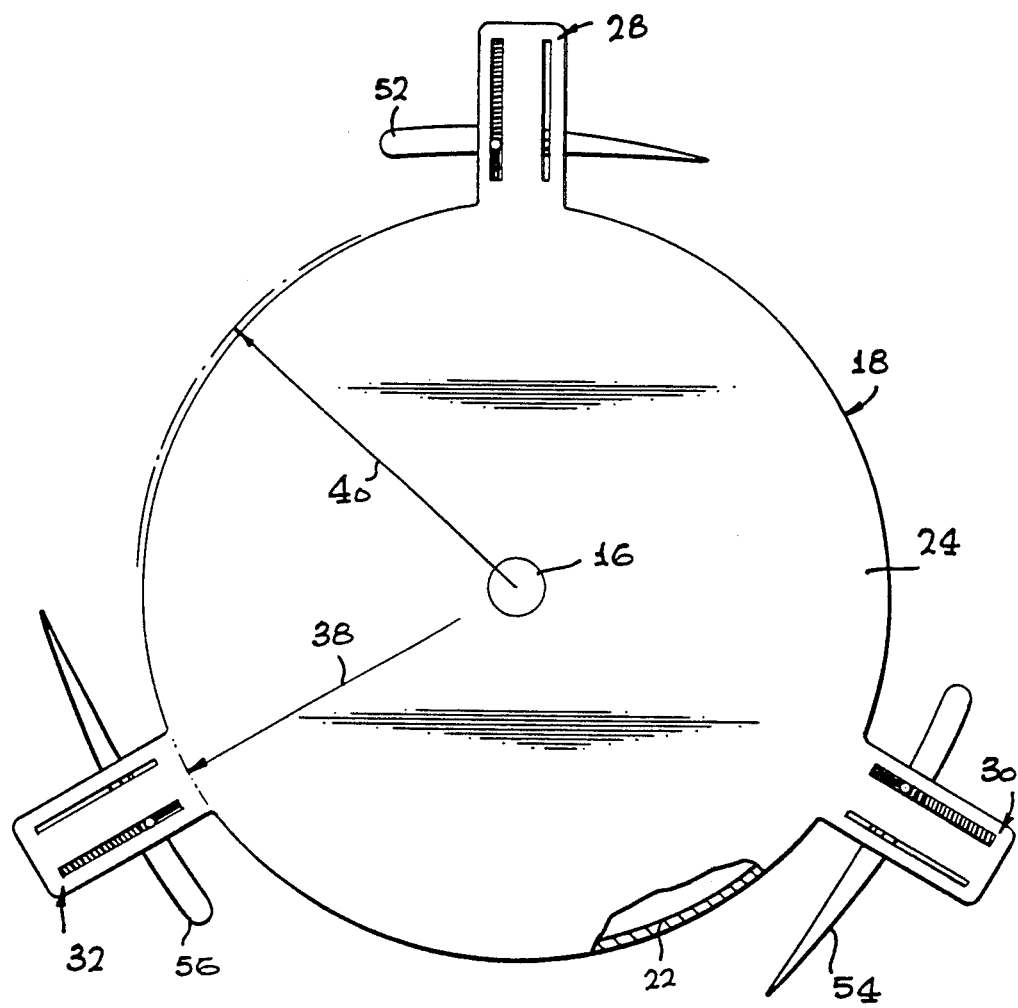
FIG. 2 is an enlarged plan view thereof, with parts broken away and parts taken in section.

As is seen in FIG. 2, drum 18 has a hollow shell 22 to which is attached top cap 24. An identical bottom cap 26 is shown in FIG. 1 as attached to the bottom of the hollow shell to form the drum. The drum, shell and caps may be metallic and filled with light-weight foam to provide the desired rigidity for a thin shell, should such be desirable. On the other hand, the drum can be molded of synthetic polymer composition material and optionally filled with foam. Each of the caps carries a plurality of arms thereon. Arms 28, 30 and 32 are shown in FIG. 2 as being integrally formed with the top cap. The bottom cap has three arms axially aligned therewith. In FIG. 1, arm 34 is shown axially aligned with arm 30 and arm 36 is shown as axially aligned with arm 32. As is seen in FIG. 2, the arms are equi-angularly spaced around the axis, and since there are three arms illustrated in the preferred embodiment, these three arms are spaced 120 degrees apart.

It is significant that the drum is not a cylinder of revolution, but is a three-lobe structure, with each of the three lobes being of the same shape. At the arms, the lobes are at their maximum radius. The drum is at the minimum radius 40 halfway between the lobes and the arms. The difference in radius is small, as is shown by the dot-dash line in the upper left quadrant of FIG. 2, which shows the circle defined by the swinging of the radius 38. In the preferred embodiment, the difference in radius is about 1/50th of the radius. In other words, the radius 40 is about 98 percent of the radius 38. This non-circularity of the surface of the drum is of aerodynamic significance, as is described below.

Figure 4:
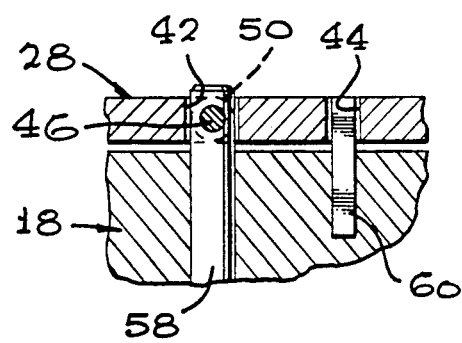
FIG. 4 is a further enlarged section taken generally along the line 4—4 of FIG. 3.
Figure 3:
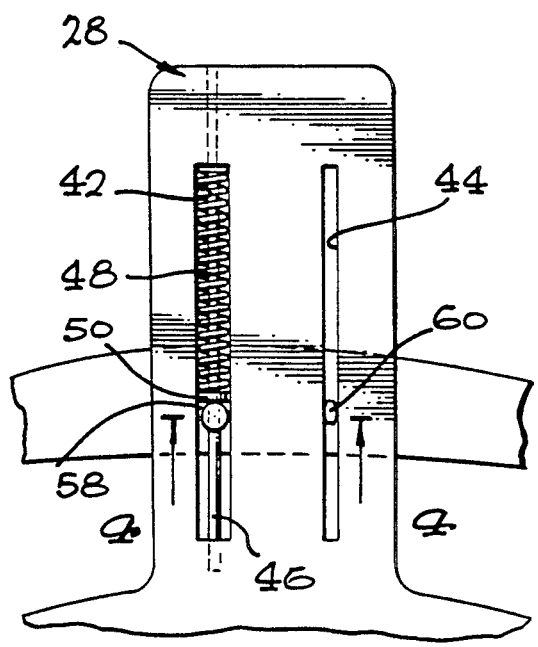
FIG. 3 is a further enlarged plan view of one of the blade-carrying arms to show the manner in which blade adjustment is accomplished.

Arm 28 is shown in detail in FIGS. 3 and 4. The arm 28 is identical to arms 30 and 32, which have the same characteristics, and is identical to the three lower arms. The lower arms are aligned with the upper arms. As is seen in FIGS. 3 and 4, arm 28 has slots 42 and 44 therein. The slots are parallel to each other and parallel on opposite sides of a radial line passing through the center of the arm 28. Slot 42 is wider and has spring guide rod 46 extending longitudinally therethrough. The spring guide rod is inserted through the slot 42 by insertion through a hole in the outer end of the arm 28 and into a socket at the inner end of the slot 42, as is shown in dashed lines in FIG. 3. Compression spring 48 is engaged around spring guide rod and has washer 50 on its inner end, as seen in FIG. 3.

Three blades 52, 54 and 56 are axially positioned exterior to the drum surface and between the arms. Blade 52 is positioned below arm 28; blade 54 is positioned between arms 30 and 34; and blade 56 is positioned between arms 32 and 36. The blades have aerodynamic contour, and a particular example is a NACA 23012 air foil, which has excellent lift-drag characteristics. Furthermore, the surface of the blade closest to the drum has a positive curvature to define a Venturi slot between the blade and the drum. The blades each carry two guide pins at each end thereof. For example, the upper end of blade 52 carries guide pins 58 and 60 thereon which respectively engage in slots 42 and 44. The guide pin 58 has a hole therethrough which embraces spring guide rod 46. Spring 48 thrusts washer 50 against guide pin 58 to resiliently urge the blade 52 toward the drum surface. Each of the other arms has similar structure, as seen in FIG. 2, for the top arms. The bottom arms are similar. Each blade is supported at approximately 35 percent chord with a blade length summation to drum perimeter of one-sixth. With a drum diameter of 12 inches, a chord length of 5 inches is suitable. The blades are mounted so that the air foil aerodynamic center is matched to the radial high point of the drum. The angle of attack of the blade with respect to a tangent line is about zero degrees, but is operative with an angle of attack from plus to minus 15 degrees with respect to the tangent line. By matching the air foil aerodynamic center to the radial high point of the drum and fixing the blade angle with respect to the radius, the operational efficiency is increased and the self-starting characteristic is enhanced. In addition, to supporting the blades, the arms form end walls to the Venturi to minimize end effects on the air foil. The placement of three blades around the circumference of the drum provides sufficient spacing to reduce interference of the blade wake from the trailing edge of one blade to the leading edge of the next.

The Venturi slot width is a function of the centrifugal force urging the blade radially outward with respect to the drum versus the resilient force of the spring urging the blade radially inward. In the preferred example, the minimum slot in the Venturi is 0.125 inch, and the maximum slot is 4.250 inches. This is self-adjusting in the preferred embodiment illustrated so that the electricity generating wind turbine is responsive to both low and high wind velocity. In the preferred example, the wind turbine starts at about 3 knots and reaches maximum power at 30 knots. The self-adjustment of the radial position of the blades and the consequent slot width is a function of the balance of the inward and outward forces on the blades. The inward force results from the spring force, and this spring force varies with gap as a function of the spring rate. The outward force is the centrifugal force which is a direct function of the rotative speed and the aerodynamic lift of the blade as it moves through the air.

The ovate cross section of the drum is an improvement of the aerodynamics at the Venturi section defined by the gap. The ovate section of the drum is essentially made up of two concentric circles with specific points on each connected with a continuous spline. In the preferred size with a substantially 12 inch diameter drum, a drum length of 28½ inches will produce a wind turbine of preferred embodiment which has a power production of about 30 kilowatt hours per day, providing wind is adequate. It is understood that the vertical orientation of the axis in shaft 16 is preferred to minimize loads on the support bearings. However, other orientations of this axis are possible. Furthermore, the generating set 20 may be placed within the base 12 in order to provide the shortest possible mechanical coupling between the turbine and generator set.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A wind turbine comprising:
   a drum having an axis, said drum having a surface which is substantially cylindrical about said axis, a plurality of aerodynamic blades;
   means to support each of said blades of said plurality of blades for rotation around said axis with respect to said surface of said drum to define an aerodynamic slot between each blade and said surface of said drum, said means for supporting each said blade including means for adjusting the size of the slot between each blade and said surface of said drum depending upon aerodynamic condition.

2. The wind turbine of claim 1 wherein each said blade is independently adjusted with respect to said surface of said drum to individually adjust said aerodynamic slot between each blade and said surface of said drum.

3. The wind turbine of claim 2 wherein said means for adjusting includes a spring associated with each said blade for urging said blade toward said drum to reduce the aerodynamic slot width between said blade and said surface of said drum.

4. The wind turbine of claim 1 wherein said drum is rotatably mounted on said axis and rotates with said blades.

5. The wind turbine of claim 4 wherein said drum carries a plurality of spaced radially directed arms thereon and said blades are movably mounted with respect to said arms to vary the slot widths between said blades and said surface of said drum.

6. The wind turbine of claim 5 wherein said arms are equi-angularly positioned around said axis of said drum.

7. The wind turbine of claim 6 wherein said drum has a first end and a second end and there are three equi-angularly spaced arms adjacent said first end of said drum and three equi-angularly spaced arms adjacent said second end of said drum with said arms on said first end substantially axially aligned with said arms on said second end and said blades are positioned between said arms.

8. The wind turbine of claim 7 wherein each said blade is independently adjusted with respect to said surface of said drum to individually adjust said aerodynamic slot between each blade and said surface of said drum.

9. The wind turbine of claim 8 wherein said means for adjusting includes a spring associated with each said blade for urging said blade toward said drum to reduce the aerodynamic sloth width between said blade and said surface of said drum.

10. The wind turbine of claim 7 wherein said drum surface is ovate around said drum axis and has a larger radius at said blades than away from said blades.

11. The wind turbine of claim 10 wherein an electricity generator is mechanically connected to said blades to be driven when said blades rotate around said axis.

12. A wind turbine comprising:
a drum having an axis, means for mounting said drum so that said drum is rotatable around said axis, said drum having an outer surface substantially uniform section along said axis, said drum having a first end and a second end;
a plurality of arms secured to said drum and extending substantially radially with respect to said axis from said drum outwardly from said drum surface, said plurality of arms including a first pair of arms respectively mounted adjacent said first and second ends of said drum and extending radially outward from said drum surface and lying in a first plane through said axis, a second pair of arms respectively mounted adjacent said first and second ends of said drum and extending radially outward from said drum surface and lying in a second plane extending through said axis;
first and second aerodynamic blades respectively mounted between said first and second pairs of arms outwardly from said surface of said drum to define first and second aerodynamic slots between said blades and said surface of said drum, said blades being adjustable with respect to said surface of said drum so as to adjust the width of the slot between said blades and said drum.

13. The wind turbine of claim 12 wherein said first and second planes through said axis are spaced around said axis to define equal spacing between said blades circumferentially around said drum.

14. The wind turbine of claim 13 wherein said surface of said drum is ovate so that it has a larger radius at said slots beneath said blades than between said first and second planes so as to increase aerodynamic effectiveness of the slots.

15. The wind turbine of claim 14 wherein each of said blades is respectively movable in its arms to effect adjustment between said blades and said surface of said drum to define slot width beneath said blades.

16. The wind turbine of claim 15 wherein each of said blades is individually adjustable.

17. The wind turbine of claim 15 wherein each of said blades is resiliently mounted with respect to its arms so that resilient force tends to move said blades to reduce slot width while centrifugal force and aerodynamic force tend to increase slot width.

18. The wind turbine of claim 17 wherein said resilient mounting comprises a spring engaged between each said blade and each of its mounting arms.

19. The wind turbine of claim 18 further including a guide slot in at least one of said arms in each of said pair of arms and a guide pin engaging in said guide slot for controlling the angle of each blade with respect to said surface of said drum.

20. The wind turbine of claim 19 further including an electrical generator mechanically connected to said wind turbine to be rotated thereby.

* * * * *